C. N. GEROSA.
MUD HOOK.
APPLICATION FILED SEPT. 28, 1920.
1,421,452.
Patented July 4, 1922.
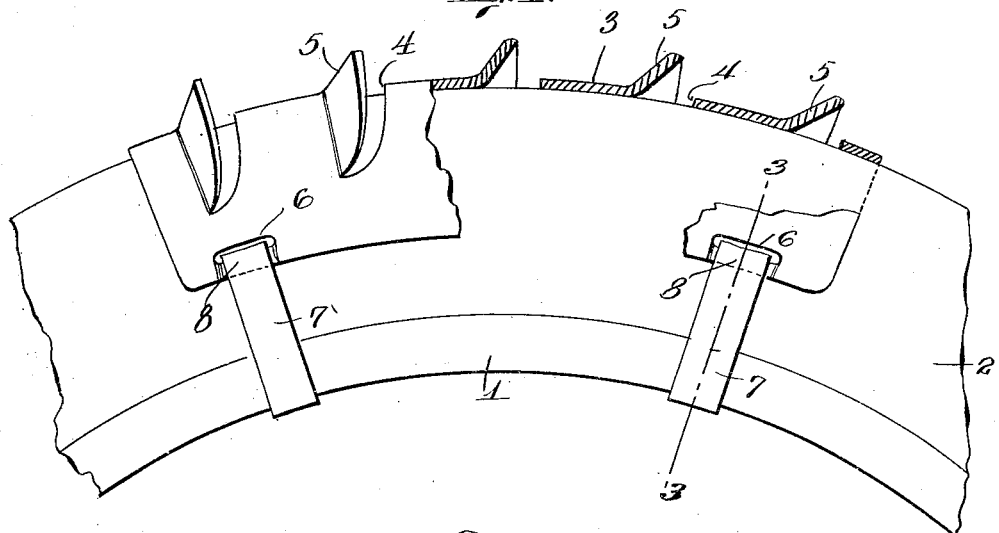
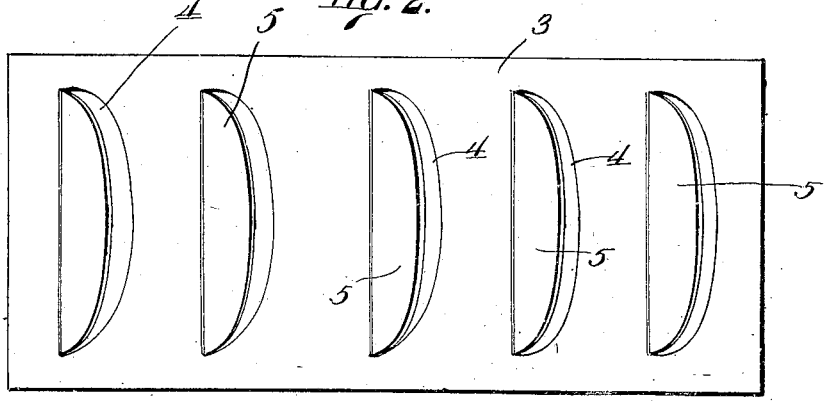
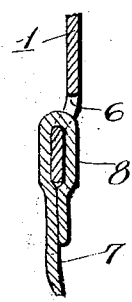
Inventor
Carl N. Gerosa

UNITED STATES PATENT OFFICE.

CARL NAPOLION GEROSA, OF AUGUSTA, GEORGIA.

MUD HOOK.

1,421,452. Specification of Letters Patent. Patented July 4, 1922.

Application filed September 28, 1920. Serial No. 413,287.

*To all whom it may concern:*

Be it known that I, CARL N. GEROSA, a citizen of the United States, residing at Augusta, in the county of Richmond and State of Georgia, have invented certain new and useful Improvements in a Mud Hook, of which the following is a specification.

This invention relates to mud hooks and more particularly to a mud hook adapted for application to the tread of a pneumatic tire, especially with the type used on automobiles.

The primary object of the invention is to provide a device which may be placed over the tread of the tire and which will include means whereby a firm grip may be obtained in the mud or sand through which the vehicle wheel travels, thereby preventing loss of traction and assist the vehicle out of the mud or sand when the power is applied to the wheels.

Another object of the invention is to provide a simple inexpensive apparatus which may be constructed of metal and which may be easily mounted in position and will readily adapt itself to various sizes and types of tires.

Other objects of the invention will appear upon consideration of the following detail description and accompanying drawings wherein:—

Figure 1 is a fragmentary view of a vehicle rim and tire showing the invention applied thereto, parts of the apparatus being broken away to more clearly disclose the structure.

Figure 2 is a plan view, and

Figure 3 is a detail cross section taken approximately on the line 3—3 of Fig. 1.

Referring to the drawing by numerals, the rim 1 is provided with the usual tire 2 and the invention is adapted to be mounted over the tread of the tire. The device consists of a metallic plate bent into the shape of a channel like body 3 adapted to fit the curvature of the tire both transversely and longitudinally. The body 3 may be of any desired length and it is provided with transverse slots 4 which are formed by slitting or cutting the body with a series of curved slits or cuts and pressing the material embraced by the slits, outwardly so that the tongues or slits 5 are formed. These members 5 form the hooks which project from the surface of the body as shown to advantage in Fig. 1 and serve as a means for gripping the mud or sand when the wheel is rotated. Obviously the hooks may be made of any desired length according to the curvature of the slits and they may also be made of any desired length according to the size of tire upon which the apparatus is used.

At the marginal edges of the body are provided openings 6 to receive the fastening bands 7 which extend around the rim of the tire and may be fastened by any suitable fastening device. As shown to advantage in Fig. 3, the material at the marginal edge of the plate adjacent the openings 6 is pressed outwardly so that the loop 8 of the fastening band 7 has its inner surface in the same plane as the inner surface of the body plate 3 thus preventing any projection which would be likely to press against the tire and injure the same. In this manner a comparatively flat surface is in contact with the tire so that no unusual wear on the tire will occur when the device is in use.

Minor changes may be made in the details of construction without departing from the spirit of the invention or the scope of the appended claim.

What is claimed is:—

In a mud hook, the combination with an automobile tire mounted on a rim, a channel like body member adapted to embrace the tread portion of the tire, the said body portion being provided with a plurality of transverse slits extending the width of the tire, the material embracing the slits being bent upwardly to form angularly disposed cleats, said cleats being curved transversely to conform with the curvature of the tire, and means to secure said body plate around the rim of the tire.

In testimony whereof, I have affixed my signature in the presence of two witnesses.

CARL NAPOLION GEROSA.

Witnesses:
C. J. SWEENEY,
G. A. SCHULZE.